US005209605A

United States Patent [19]

Cherrington

[11] Patent Number: 5,209,605

[45] Date of Patent: May 11, 1993

[54] GRAVEL-PACKED PIPELINE AND METHOD AND APPARATUS FOR INSTALLATION THEREOF

[75] Inventor: Martin D. Cherrington, Fair Oaks, Calif.

[73] Assignee: EVI Cherrington Enviromental, Inc., Houston, Tex.

[21] Appl. No.: 789,272

[22] Filed: Nov. 8, 1991

[51] Int. Cl.[5] .......... F16L 1/028

[52] U.S. Cl. .......... 405/184; 405/43; 405/50; 405/128; 405/154

[58] Field of Search .......... 405/154, 184, 36, 43, 405/45, 50, 128, 129

[56] References Cited

U.S. PATENT DOCUMENTS

| | | | |
|---|---|---|---|
| 3,536,151 | 10/1970 | Aarup | 175/422 |
| 3,859,798 | 1/1975 | Terashima et al. | 405/50 |
| 4,003,440 | 6/1977 | Cherrington | 175/61 |
| 4,091,631 | 5/1978 | Cherrington | 61/72.7 |
| 4,117,895 | 10/1978 | Ward et al. | 175/53 |
| 4,121,673 | 10/1978 | Cherrington | 175/61 |
| 4,176,985 | 12/1979 | Cherrington | 405/184 |
| 4,221,503 | 9/1980 | Cherrington | 405/184 |
| 4,453,603 | 6/1984 | Voss et al. | 175/53 |
| 4,624,604 | 11/1986 | Wagner et al. | 405/128 |
| 4,674,579 | 6/1987 | Geller et al. | 175/45 |
| 4,679,637 | 7/1987 | Cherrington et al. | 175/61 |
| 4,714,118 | 12/1987 | Baker et al. | 175/26 |
| 4,784,230 | 11/1988 | Cherrington et al. | 175/61 |
| 4,858,705 | 8/1989 | Thiery | 175/73 |
| 5,067,854 | 11/1991 | Sweeney | 405/184 |

OTHER PUBLICATIONS

"New Horizontal Wellbore System for Monitor and Remedial Wells", Superfund '90, Contaminated Groundwater Control & Well Types; Nov. 1990.

Sand Control Handbook; Chapter 6; Suman, Jr. et al., pp. 51–59.

*Primary Examiner*—David H. Corbin

*Attorney, Agent, or Firm*—Fulbright & Jaworski

[57] ABSTRACT

A gravel-packed pipeline is formed by inserting a liner pipe having a porous pipe contained therein. A conveyor pipe is attached to the liner pipe for conveying filtering material such as gravel. After positioning the liner pipe, the end of the porous pipe is pushed out and anchored. The liner is removed while the filtering material is conveyed to the hole.

24 Claims, 4 Drawing Sheets

GRAVEL-PACKED PIPELINE AND METHOD AND APPARATUS FOR INSTALLATION THEREOF

TECHNICAL FIELD OF THE INVENTION

This invention relates in general to underground conduits, and more particularly to a gravel-packed pipeline.

BACKGROUND OF THE INVENTION

Underground conduits are widely used for the transmission of fluids and gases, such as in pipelines and the like, as well as for carrying wires and cables for the transmission of electrical power and electrical communications signals. While the installation of such conduits is time-consuming and costly for locations where the earth can be excavated from the surface, the routing of such conduits becomes more difficult where the surface excavation cannot be done due to the presence of surface obstacles through which the excavation cannot easily proceed. Such surface obstacles include highways and railroads where the installation of a crossing conduit would require the shutdown of traffic during the excavation and installation. Such surface obstacles also include rivers, which present extremely difficult problems for installing a crossing conduit due to their size and difficulty of excavation thereunder.

Prior methods for the installation of conduit have included the use of directional drilling for the formation of an enrouted underground arcuate path extending between two surface locations and under the surface obstacle with the conduit installed along the drilled path. A conventional and useful method for installing such underground conduits is disclosed in U.S. Pat. No. 4,679,637, issued Jul. 14, 1987, assigned to Cherrington Corporation, and U.S. Pat. No. 4,784,230, issued Nov. 15, 1988, assigned to Cherrington Corporation, both of which are incorporated by reference herein.

Several shortcomings of the prior methods are discussed in connection with U. S. application Ser. No. 557,992, filed Jul. 26, 1990, entitled "Improved Method and Apparatus for Enlarging an Underground Path", to Martin Cherrington and assigned to Cherrington Corporation, which is also incorporated by reference herein. A major concern in forming an underground conduit in a near horizontal position is the removal of cuttings resulting from the reaming operation. These cuttings may inhibit the pre-reaming and reaming operations and further inhibit the installation of the pipeline. It is believed that the cuttings, many of which are heavier than the fluid transporting them, will settle towards the bottom of the underground hole and then build up into a circumferential packed mass, especially when the rate of reaming is poor.

One application of horizontal conduits is for removing fluids and gases from a subterranean area. For example, a horizontal well could be drilled to reach an aquifer which would otherwise be unreachable because of a man-made or natural structure above the aquifer. Another application would be the removal of hazardous wastes which have leached into the soil, for example, from a oil tank above the subterranean area. A third application would be the infusion of gases or liquids into a subterranean area from a above-ground station.

In these applications, it is desirable to have a filtering medium, such as gravel, surrounding a slotted, or otherwise porous, pipe. Heretofore, centering a slotted pipe within a horizontal hole and surrounding the pipe with the filtering medium has been problematic. Prior art methods, such as filling the horizontal hole with a gravel and water mix and removing the water through the slotted pipe have proven ineffective in wells having a hole angle of approximately 45°-50° from the vertical. If the slotted pipe is not sufficiently surrounded with the filtering medium, materials from the horizontal hole will clog the slotted pipe and may foul the liquid or gas being removed. Furthermore, the cuttings remain in the hole, the filtering medium may become contaminated, thereby reducing its effectiveness.

Therefore, a need has arisen for a effective method and apparatus for installing a horizontal porous pipe surrounded by a filtering medium.

SUMMARY OF THE INVENTION

In one aspect of the present invention, a porous pipe is placed within a hole using a liner pipe for containing the porous pipe. The liner pipe is removed from the hole while maintaining the porous pipe in a desired position within the hole. A material conveyor pipe coupled to the liner pipe conveys the filtering material to the hole during removal of the liner pipe.

This aspect of the present invention provides the advantage that the filtering material is placed in the hole about the slotted pipe in a manner which thoroughly packs the hole with the filtering material.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1:
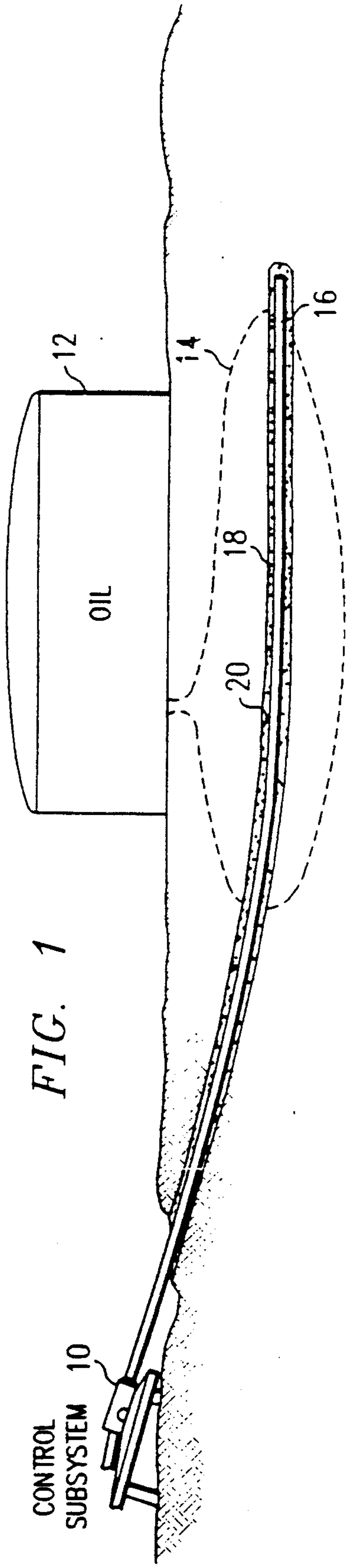
FIG. 1 illustrates a cross-sectional diagram showing a gravel-packed porous pipeline used in an exemplary embodiment of toxic waste removal.

FIG. 1 illustrates a cross-sectional view of a gravel-packed pipeline used in an exemplary embodiment to remove toxic waste. While the embodiment shown in FIG. 1 illustrates use of a gravel-packed pipeline for toxic waste removal, it should be noted that the gravel-packed pipeline may be useful in any environment where liquids or gases are to be extracted from or infused to a desired subterranean region.

In FIG. 1, a control subsystem 10 removes toxic waste (shown as a leak from oil tank 12) from a plume 14. The control subsystem 10 is coupled to a pipe 16 which is porous in the area of the plume 14. The porous pipe 16 is surrounded by a filtering material 18 which separates the porous pipe 16 from the walls of hole 20.

In the preferred embodiment, the porous pipe 16 comprises a slotted pipe, such as that sold under the trademark CIRCUMSLOT by Brainard-Kilman. Slotted pipes typically have slots of 0.010 or 0.020 inches, but other slot sizes may be appropriate depending upon the application. A slotted pipe is typically slotted around the entire circumference of the pipe to maximize flow through the pipe; however, in certain applications, another pipe structure may be appropriate.

In operation, the toxic waste from the plume 14 is drawn to the porous pipe 16 responsive to suction created by the control subsystem 10 or by a pump situated within pipe 16. The filtering material 18 (typically comprising gravel or sand) prevents material from the surrounding subterranean area, specifically from the walls of hole 20, from clogging the porous pipes 16. The toxic waste is then processed by the control subsystem 10 or removed offsite to another toxic waste control subsystem.

Figure 2A:
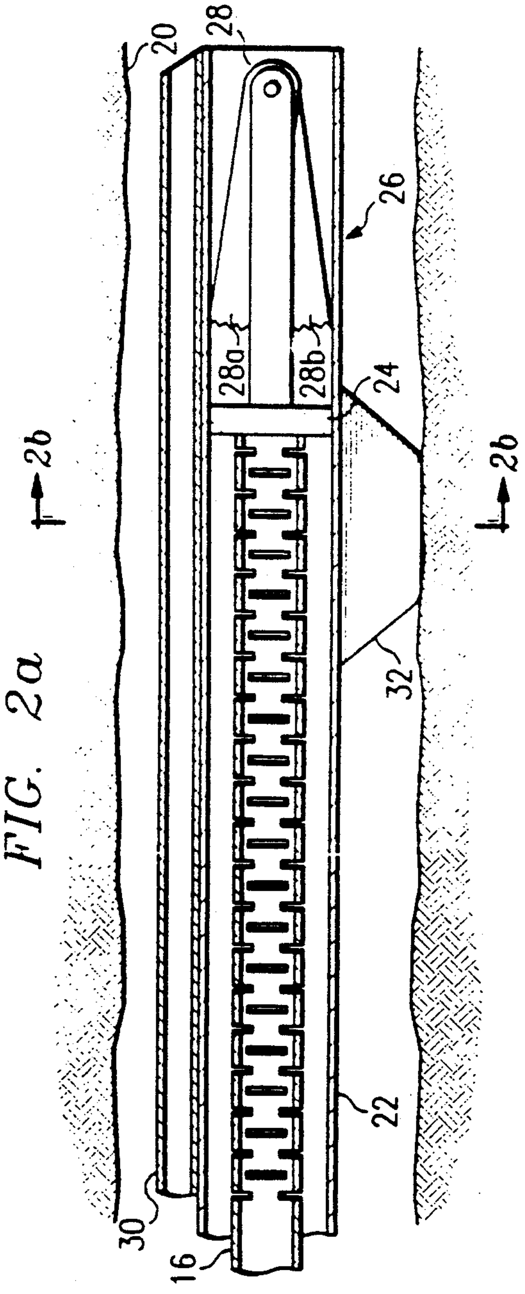
FIGS. 2*a*–*b* illustrate cross-sectional side and front views of apparatus for forming a gravel-packed porous pipeline after a first stage.
Figure 2B:
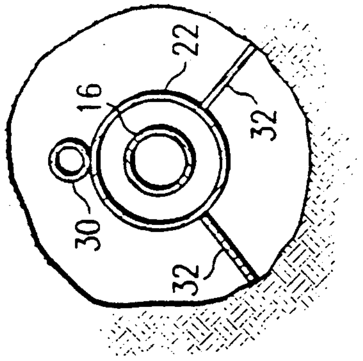

FIGS. 2*a–b* illustrates a cross-sectional side view of the apparatus used to place the porous pipe within the hole 20. The porous pipe 16 is placed within a liner pipe 22. A piston seal 24 creates an airtight seal between the end of the porous pipe 16 and an extended portion 26 of the liner pipe 22. A toggle anchor 28 is coupled to the seal 24 and slotted pipe 16, and is held in a contracted position within the extended portion 26 of the liner pipe 22. A conveyor pipe 30 is disposed above and coupled to the liner pipe 22. Stabilizers 32 are coupled to the bottom of the liner pipe 22 to maintain the liner pipe 22 substantially in the center of hole 20. Additional stabilizers 32 could be added for additional support or, in some instances, conveyor pipe 30 may act as a third stabilizer.

In the preferred embodiment, the stabilizer is typically manufactured from steel. The liner pipe 22 is typically a metal drill pipe, such as aluminum, and the conveyor pipe 30 is typically a steel pipe. The anchor 28 is manufactured from metal and is spring-loaded such that when the toggle anchor 28 is removed from the liner pipe 22, its anchor members 28*a–b* will extend outward to contact the walls of hole 20.

The piston seal 24 is typically a bunyl-rubber material. The liner pipe may be machined in the extended region 26 to provide extra smoothness.

The sizes of the respective liner and porous pipes 22 and 16 will vary depending upon application. The conveyor pipe 30 would typically have an outside diameter of approximately 1¾ inches in order to convey 3/16 inch gravel size.

In operation, the assembly shown in FIG. 2*a* is pushed into hole 20 from the surface. Formation of the hole 20 is discussed in greater detail below. The assembly of pipes is pushed into the hole 20 until the porous pipe 16 is substantially positioned within the plume 14.

Once positioned, the porous pipe 16 is removed from the liner pipe 22 as illustrated in connection with FIGS. 3*a–b*.

Figure 3A:
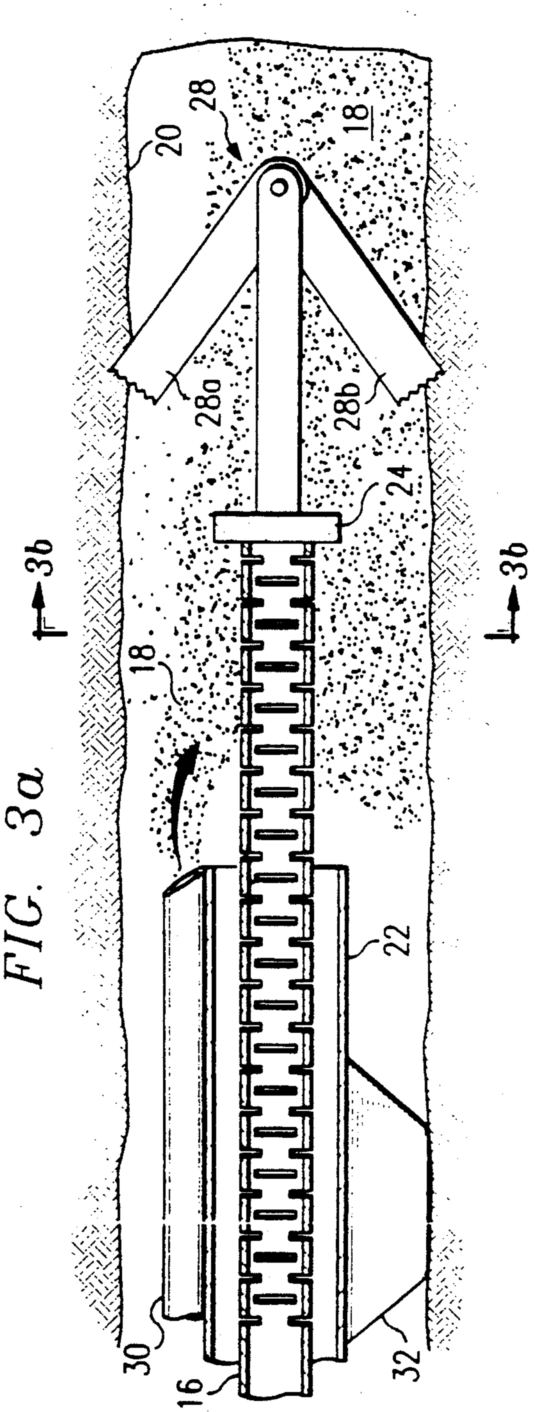
FIGS. 3*a*–*b* illustrate cross-sectional side and front views of the apparatus of FIGS. 2*a*–*b* after a second processing stage.
Figure 3B:
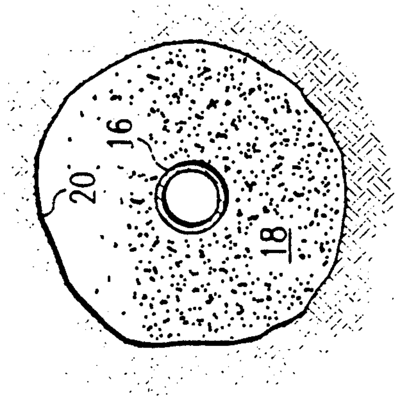

FIGS. 3*a–b* illustrate cross-sectional side and front views of the installation of the gravel-packed porous pipe after a second step. The piston seal 24 is pushed out of the liner pipe 22 by exerting air or water pressure within the liner pipe 22. This pressure may be provided from the surface using a mud pump or similar device. Once the toggle anchor 28 has cleared the liner pipe 22, the anchor members 28*a–b* are forced outward to the walls of the hole 20. The anchor members 28*a* and 28*b* have edges which dig into the holes of the wall 20 thereby locking the porous pipe 16 in place. Once the toggle anchor 28 is secure, the liner pipe 22 may be removed, typically by using a drilling machine. During removal, the stabilizers 32 maintain the liner pipe 22 in a desired position such that the porous pipe 16 is substantially centered.

As the liner pipe 22 is removed, the filtering material 18 is expelled from the conveyor pipe 30. The filtering material may be forced through the conveyor pipe 30 using a machine for mixing dry material and compressed air, such as the REED SOVA and SOVE GUNCRETE machines manufactured by Reed Manufacturing of Walnut, Calif. By forcing the filtering material 18 through the conveyor pipe 30 such that it is expelled at the end of the liner pipe 22 as it is withdrawn from the hole, the filtering material will completely fill the hole 20 without pockets of unfilled space which would allow material from the walls of the hole 20 to enter and obstruct the porous pipe 16.

The hole 20 may be formed in a variety of ways; however, the preferred method is to drill a pilot hole (for example, a two-inch hole) which is enlarged using a wash-over pipe (to about four inches). The wash-over pipe has a bit which opens the hole further (to about nine inches). The method is described in detail in U.S. Pat. No. 4,003,440, to Cherrington, which is incorporated by reference herein.

To facilitate insertion and removal of the liner pipe 22 and to remove debris which may contaminate the filtering material 18, it is desirable to remove the cuttings from the hole after hole formation.

Figure 4:
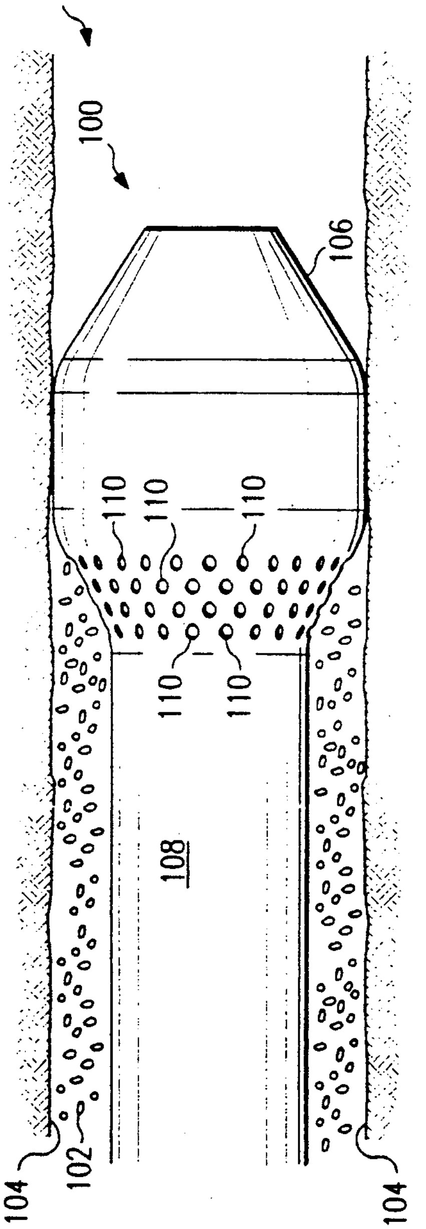
FIG. 4 is a side view of the preferred embodiment of hole cleaning device of the present invention.

FIG. 4 illustrates a cutaway view of a preferred embodiment of a hole cleaning device. In FIG. 4, the hole cleaning device 100 is shown in hole 20 having cuttings 102 remaining in hole 20. The exterior of the hole cleaning device 100 has a tapered front 106 to allow the hole cleaning device 100 to follow the contours of hole 20. Housing 108 has openings 110 to allow the cuttings 102 to pass from the hole 20 to the interior of the hole cleaning device 100.

In operation, the hole cleaning device 100 is rotated within hole 20 by a drilling motor on the surface. A pressure differential is created, as will be described in greater detail in connection with FIGS. 5 and 6, to draw the cuttings 102 through the openings 110. The cuttings 102 will be transported out of the hole 20 for processing by a solids control system (not shown).

Figure 5B:
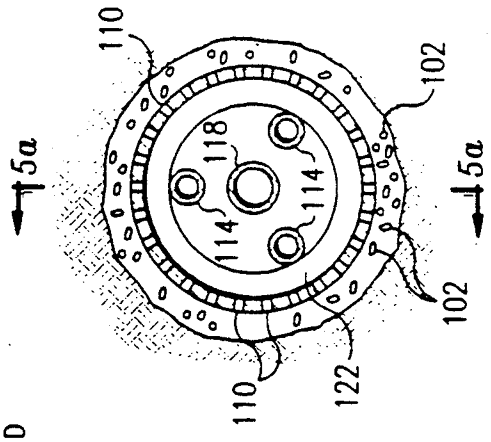
FIGS. 5*a*–*b* are cross-sectional side and front views of the hole cleaning device of FIG. 3.
Figure 5A:
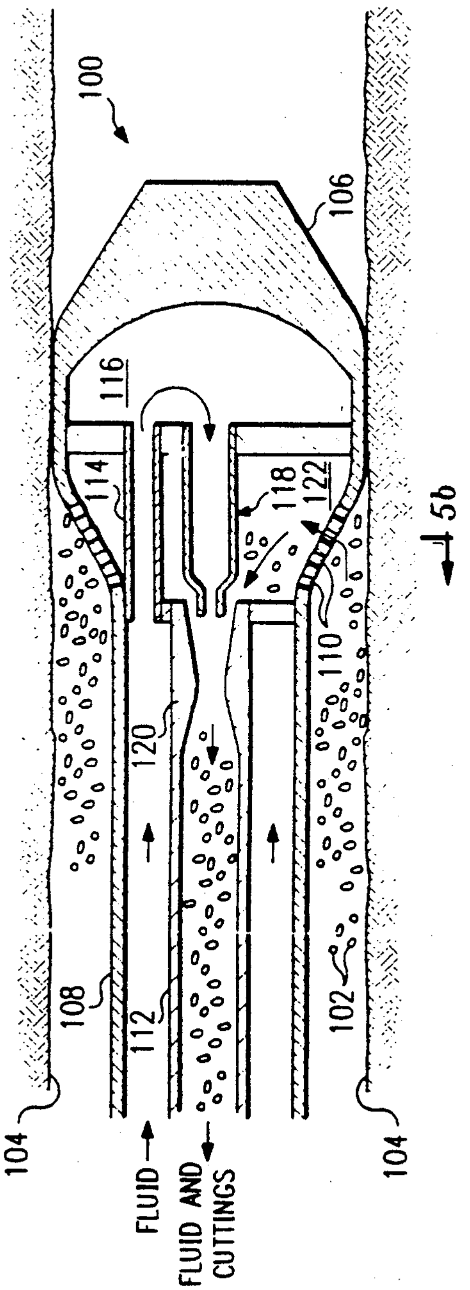

FIGS. 5*a–b* illustrate a cross-sectional side view and a cross-sectional front view, respectively, of the hole cleaning device 100 which uses a jet pump to remove cuttings from the hole. A jet pump uses a stream of fluid (or gas) under controlled conditions to create a low-pressure area to which another material (in this case, cuttings) is drawn and subsequently combined with the fluid. Interior to the housing 108 is an outlet pipe 112. A cleaning substance, typically water or drilling fluid, is forced between the housing 108 and the outlet pipe 112. The fluid is fed through one or more inlet pipes 114 to a chamber 116. From the chamber 116, the fluid is forced through a jet nozzle assembly 118 into a diffuser assembly 120 which is in communication with the outlet pipe 112. The flow of the fluid through the nozzle assembly 118 and the diffuser assembly 120 causes a pressure differential by the Venturi effect. This pressure differential acts as a pump to draw the cuttings 102 through the openings 110 into the suction chamber 122 which is in communication with the diffuser assembly 120. The cuttings 102 in the chamber 122 are further drawn through the diffuser assembly 120 where they are mixed with the fluid and transported to the surface via outlet pipe 112.

FIG. 5*b* illustrates a cross-sectional front view showing the preferred embodiment of the hole cleaning device 100 of FIG. 4 wherein three inlet pipes 114 are used to transport the fluid from the area between the housing 108 and the outlet pipe 112 to the chamber 116.

In the preferred embodiment, the openings 110 are formed by providing holes through the exterior of the housing 108. During rotation of the housing, the holes will break large cuttings to a size which may be passed into the diffuser assembly 120. Thus, the size of the openings 110 should be determined based on the spacing between the jet nozzle assembly 118 and the diffuser assembly 120. In the illustrated embodiment, a ¾ inch diameter hole has been found effective. Alternatively, a grate or other structure to size the cuttings could be implemented about the housing 108.

The space between nozzle assembly 118 and the diffuser assembly 120 is important to the operation of the hole cleaning device 100. An optimum length depends upon a number of factors including the composition of the subsurface through which the hole 20 is drilled, the speed of the fluid out of the jet nozzle, and the shape of the diffuser assembly 120. The illustrated embodiment shows an adjustable nozzle (illustrated in greater detail in FIG. 6*b*) which allow adjustments to provide the maximum cleaning action. The shape of diffuser assembly 120 also affects the efficiency of the hole cleaning operation.

Figure 6A:
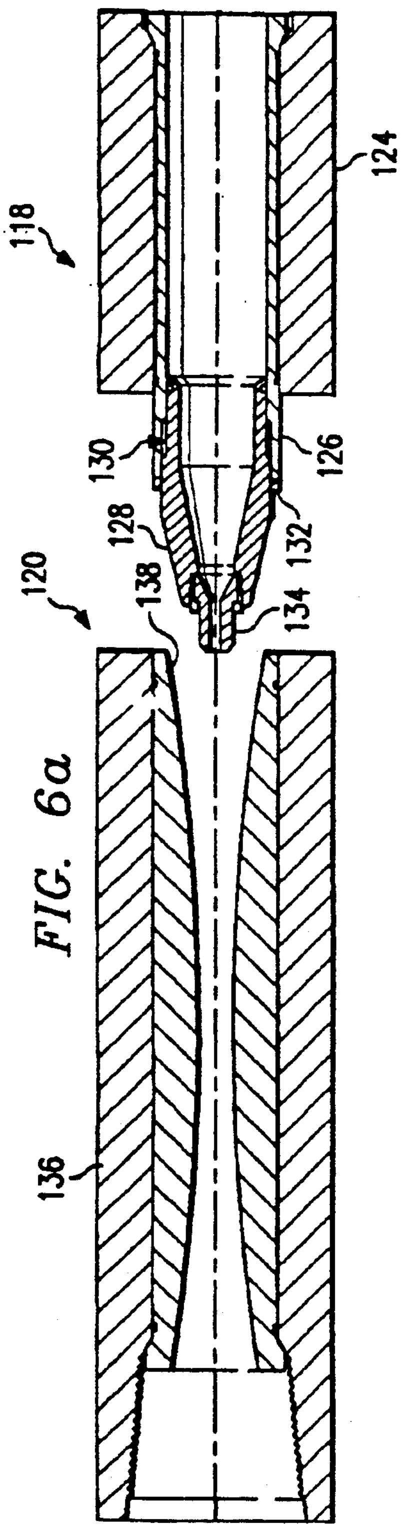
FIGS. 6*a*–*b* are detailed cross-sectional views of the nozzle and throat assemblies.

FIG. 6*a* illustrates a detailed cross-sectional diagram of the nozzle assembly 118 and diffuser assembly 120. The jet nozzle assembly 118 includes an outer sleeve 124 into which an inner sleeve 126 is placed. A nozzle housing 128 is threaded into inner sleeve 126. Threads 130 allow the nozzle housing 128 to be extended or retracted into inner sleeve 126. Lock nut 132 holds the nozzle housing in place. Jet nozzle tip 134 is held by nozzle housing 128. The illustrated embodiment is best suited for experimentation to determine an optimum configuration for a particular application. After determining the optimum configuration, a fixed length jet nozzle would normally be used.

The diffuser assembly 120 includes outer sleeve 136 having diffuser 138 connected thereto. Outer sleeve 136 is coupled to outlet tube 112.

Figure 6B:
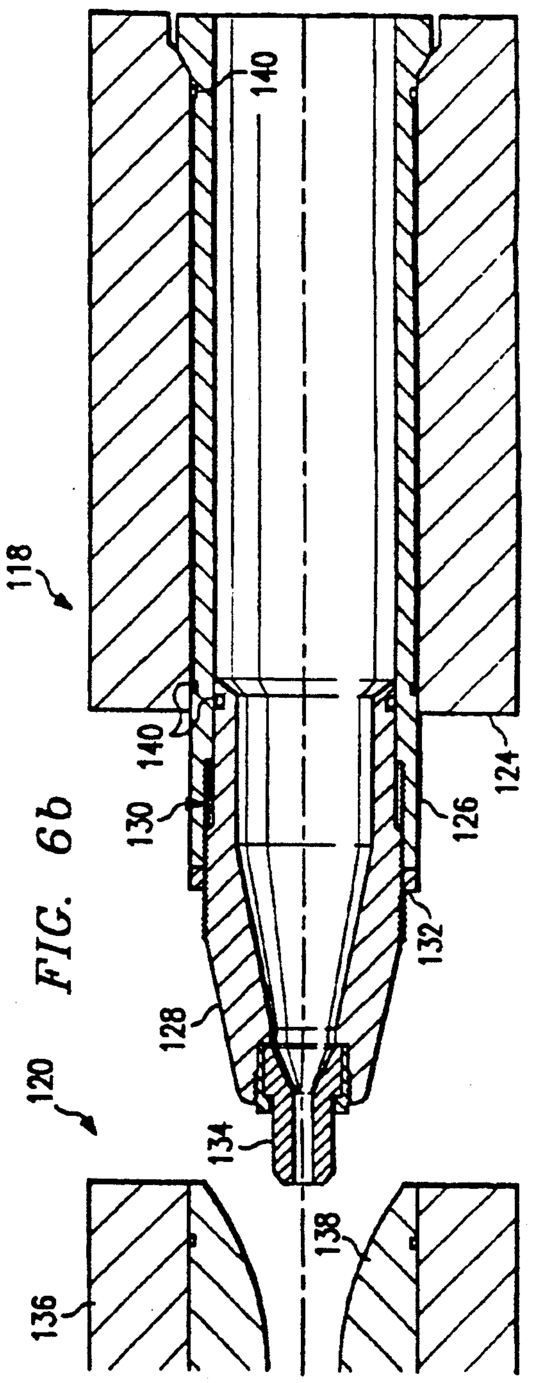

FIG. 6*b* is a detailed cross-sectional side view of the jet nozzle assembly 118. This view shows a more detailed view of the threads 130 between the nozzle housing 128 and the inner sleeve 126. Also shown are O-rings 140 for maintaining a seal between the assembly subcomponents.

While the present invention is illustrated in connection with the hole cleaner which operates to remove cuttings while being pulled towards surface, cuttings could also be removed as the hole cleaning device is pushed forward through the hole. Other devices for reaming and cleaning the hole are shown in U.S. patent application Nos. 789,356 and 790,223, entitled "Method and Apparatus for Cleaning a Bore Hole" and "Method and Apparatus for Cleaning A Bore Hole Using a Rotary Pump", both to Cherrington, filed contemporaneously herewith, and incorporated by reference herein.

Although the present invention and its advantages have been described in detail, it should be understood that various changes, substitutions and alterations can be made herein without departing from the spirit and scope of the invention as defined by the appended claims.

What is claimed is:

1. Apparatus for placing a porous pipe surrounded by filtering material in a horizontal subsurface hole, comprising:
 - a liner pipe for containing the porous pipe during placement of the porous pipe in the hole;
 - apparatus for removing the liner pipe from the hole while maintaining the porous pipe in a desired position within the hole; and
 - a material conveyor pipe coupled to the liner pipe for conveying the filtering material to the hole during removal of the liner pipe.

2. The apparatus of claim 1 wherein said removing apparatus comprises:
 - apparatus for moving an end of the porous pipe outside the liner pipe; and
 - an anchor coupled to the porous pipe for attaching the porous pipe to the subsurface.

3. The apparatus of claim 1 wherein said removing apparatus comprises:
 - apparatus for creating a pressure differential between the inside and outside of the liner pipe; and
 - a seal disposed between the liner pipe and the porous pipe for moving the porous pipe relative to the liner pipe responsive to the air pressure differential.

4. The apparatus of claim 2 wherein said anchor comprises first and second spring-loaded anchor portions operable to fit within the porous pipe in a compressed position.

5. The apparatus of claim 1 wherein said material conveyor pipe is fixedly attached to the liner pipe.

6. The apparatus of claim 1 and further comprising apparatus coupled to the material conveyor pipe for receiving the material and mixing the material with a compressed gas to force the material through the material conveyor pipe.

7. The apparatus of claim 1 and further comprises positioning means for positioning the liner pipe in the hole to maintain a desired distance between the wall for the hole and the porous pipe.

8. Apparatus for retrieving hazardous material from a subsurface area comprising:
 - a porous pipe disposed substantially parallel to the surface, said porous pipe operable to transport the hazardous material;
 - an anchor having protruding sections for holding the porous pipe within the subsurface area;
 - a filtering material layer surrounding the porous pipe to prevent subsurface material from obstructing said porous pipe; and
 - a pump for evacuating material from the pipe.

9. The apparatus of claim 8 wherein said anchor comprises first and second anchor members and a spring for forcing the anchor members apart.

10. The apparatus of claim 8 wherein said filtering material layer comprises a gravel layer.

11. The apparatus of claim 8 wherein said porous pipe comprises a slotted pipe.

12. The apparatus of claim 11 wherein said slotted pipe comprises a PVC slotted pipe.

13. A method of installing a material-packed porous pipe in a subterranean hole comprising the steps of:
 - placing a liner pipe containing the porous pipe and coupled to a conveyor pipe in the subsurface hole;

anchoring the porous pipe within the hole; and simultaneously removing the liner pipe and transporting the material through the conveyor pipe to the hole to surround the porous pipe.

14. The method of claim 13 wherein said anchoring step comprises the steps of forcing an end of the porous pipe out of the liner pipe and extending anchor members attached to the end of the pipe to contact the sides of the hole.

15. The method of claim 14 wherein said forcing step comprises the step of creating a pressure differential between the inside and outside of the liner pipe.

16. The method of claim 13 wherein said removing step includes the step of removing the liner pipe such that the porous pipe is maintained at a desired distance from the walls of the hole.

17. The method of claim 16 wherein said removing step includes the step of spacing the liner pipe from the walls of the hole.

18. The method of claim 13 wherein said removing step comprises the step of simultaneously removing the liner pipe and transporting gravel through the conveyor pipe to the hole to surround the porous pipe.

19. The method of claim 13 and further comprising the step of removing cuttings from the hole prior to placing the liner pipe therein.

20. The method of claim 19 wherein said step of removing cuttings comprises the step of removing the cuttings using a jet pump.

21. Apparatus for placing a porous pipe surrounded by filtering material in a horizontal subsurface hole, comprising:

a liner pipe for containing the porous pipe during placement of the porus pipe in the hole;

apparatus for removing the liner pipe from the hole while maintaining the porus pipe in a desired position within the hole; and a material conveyor pipe coupled to the liner pipe for conveying the filtering material to the hole during removal of the liner pipe to positively place the filtering material around said liner pipe.

22. The apparatus of claim 21 wherein said material conveyor pipe has a first end proximate the distal end of the liner pipe such that the filtering material surrounds the porus pipe as it emerges from the liner pipe.

23. The apparatus of claim 1 wherein said material conveyor pipe is coupled to the inside of the linear pipe.

24. The apparatus of claim 21 wherein said material conveyor pipe is coupled to the inside of the linear pipe.

* * * * *